United States Patent
Otis, Jr. et al.

(10) Patent No.: US 11,426,927 B2
(45) Date of Patent: Aug. 30, 2022

(54) DIFFERENT MIXTURES OF BUILD MATERIALS DELIVERABLE DURING A THREE DIMENSIONAL PRINT OPERATION

(71) Applicant: HEWLETT-PACKARD DEVELOPMENT COMPANY, L.P., Houston, TX (US)

(72) Inventors: David R. Otis, Jr., Corvallis, OR (US); Kevin E. Swier, Corvallis, OR (US); Justin M. Roman, Vancouver, WA (US); Wesley R. Schalk, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 11 days.

(21) Appl. No.: 16/075,675

(22) PCT Filed: Jul. 31, 2017

(86) PCT No.: PCT/US2017/044725
§ 371 (c)(1),
(2) Date: Aug. 6, 2018

(87) PCT Pub. No.: WO2019/027429
PCT Pub. Date: Feb. 7, 2019

(65) Prior Publication Data
US 2021/0197449 A1    Jul. 1, 2021

(51) Int. Cl.
*B33Y 10/00*    (2015.01)
*B33Y 30/00*    (2015.01)
(Continued)

(52) U.S. Cl.
CPC .......... *B29C 64/153* (2017.08); *B29C 64/329* (2017.08); *B29C 64/336* (2017.08);
(Continued)

(58) Field of Classification Search
CPC .......... B22F 10/70; B22F 10/73; B22F 12/52; B29C 64/357; B29C 64/329; B29C 64/336

See application file for complete search history.

(56) References Cited

U.S. PATENT DOCUMENTS

| | | | |
|---|---|---|---|
| 9,610,735 | B2 | 4/2017 | Yoo et al. |
| 2004/0141043 | A1 | 7/2004 | Silverbrook |

(Continued)

FOREIGN PATENT DOCUMENTS

| | | |
|---|---|---|
| AU | 2012330948 A1 | 5/2014 |
| CN | 103980698 A | 8/2014 |

(Continued)

OTHER PUBLICATIONS

"Pischevye 3D-printery", Retrieved from Internet: http://www.orgprint.com/wiki/3d-pechat/pischevye-3D-printery/, Apr. 3, 2013, 6 pages.

(Continued)

*Primary Examiner* — Joseph S Del Sole
*Assistant Examiner* — Ariella Machness
(74) *Attorney, Agent, or Firm* — HP Inc. Patent Department

(57) ABSTRACT

Example implementations relate to different mixtures of build materials deliverable during a three dimensional (3D) print operation. In some examples, a 3D print apparatus may include a delivery hopper to deliver build material to a print zone of the 3D print apparatus and a plurality of build material hoppers to which the delivery hopper is connected for receipt of at least one of a corresponding plurality of build materials. A controller of the 3D print apparatus may direct that variable proportions of a first build material relative to a second build material are receivable by the delivery hopper from the plurality of build material hoppers (Continued)

during the 3D print operation, where different mixtures of the variable proportions of the first build material and the second build material are deliverable to the delivery hopper during the 3D print operation.

13 Claims, 6 Drawing Sheets

(51) Int. Cl.
    *B33Y 40/00*          (2020.01)
    *B29C 64/329*        (2017.01)
    *B29C 64/336*        (2017.01)
    *B29C 64/153*        (2017.01)
    *B29C 64/357*        (2017.01)

(52) U.S. Cl.
    CPC ............ *B29C 64/357* (2017.08); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 2004/0265413 A1 | 12/2004 | Russell et al. | |
| 2006/0054039 A1 | 3/2006 | Kritchman et al. | |
| 2006/0214335 A1* | 9/2006 | Cox | B01F 5/10 |
| | | | 264/497 |
| 2010/0192806 A1 | 8/2010 | Heugel et al. | |
| 2010/0327479 A1* | 12/2010 | Zinniel | B29C 64/118 |
| | | | 264/172.14 |
| 2012/0178845 A1* | 7/2012 | Napadensky | C08L 35/02 |
| | | | 522/96 |
| 2013/0000549 A1 | 1/2013 | Hartmann | |
| 2014/0251481 A1 | 9/2014 | Kroll et al. | |
| 2015/0266235 A1* | 9/2015 | Page | B29C 64/106 |
| | | | 264/245 |
| 2016/0193696 A1 | 7/2016 | McFarland et al. | |
| 2016/0332376 A1 | 11/2016 | Ramirez Muela et al. | |
| 2016/0339639 A1 | 11/2016 | Chivel | |
| 2017/0028468 A1 | 2/2017 | Dellea et al. | |
| 2017/0120332 A1 | 5/2017 | Demuth et al. | |
| 2017/0348771 A1* | 12/2017 | Kawada | B29C 64/35 |
| 2018/0264731 A1* | 9/2018 | Kritchman | B29C 64/106 |

FOREIGN PATENT DOCUMENTS

| | | | |
|---|---|---|---|
| CN | 104859146 A | 8/2015 | |
| CN | 105086347 A | 11/2015 | |
| CN | 105163930 A | 12/2015 | |
| CN | 105196550 A | 12/2015 | |
| CN | 105328907 A | 2/2016 | |
| CN | 105658356 A | 6/2016 | |
| CN | 105728723 A | 7/2016 | |
| CN | 105939836 A | 9/2016 | |
| CN | 106061713 A | 10/2016 | |
| CN | 106696264 | 5/2017 | |
| CN | 106985387 A | 7/2017 | |
| CN | 110891766 | 7/2017 | |
| DE | 102015222689 | 5/2017 | |
| EP | 1700686 | 9/2006 | |
| EP | 1700686 | 10/2006 | |
| GB | 2550551 A | 11/2017 | |
| JP | 2001-096558 A | 4/2001 | |
| JP | 2017-019111 A | 1/2017 | |
| WO | 95/34468 A1 | 12/1995 | |
| WO | 2015141779 | 9/2015 | |
| WO | 2016165746 A1 | 10/2016 | |
| WO | WO-2016165746 A1 * | 10/2016 | ............. B22F 10/70 |
| WO | WO-2016165747 A1 * | 10/2016 | ............. B22F 12/00 |
| WO | WO-2018109477 A1 * | 6/2018 | ............. B33Y 30/00 |

OTHER PUBLICATIONS

Singh et al., "Effective Use Of Recycled Raw Material In Selective Laser Sintering Process", SSRG International Journal of Mechanical Engineering (SSRG-IJME), vol. 2, Issue No. 7, Retrieved from Internet: http://www.internationaljournalssrg.org/IJME/2015/Volume2-Issue7/IJME-V2I7P106.pdf, Jul. 7, 2015, 7 pages.

* cited by examiner

DIFFERENT MIXTURES OF BUILD MATERIALS DELIVERABLE DURING A THREE DIMENSIONAL PRINT OPERATION

BACKGROUND

Using new build materials (e.g., previously unused powder) to perform a three-dimensional (3D) print operation may be costly. The build material that is not solidified or fused may be recovered after a 3D print operation is completed and the recovered build material may be recycled (e.g., by being combined with some unused build material) in preparation for a next 3D print operation. It may be more efficient and/or less costly to combine some unused build material with some recycled build material. In some implementations, the unused build material may be combined with the recycled build material in preparation for (e.g., prior to) using the combination for completion of the entire next 3D print operation.

DETAILED DESCRIPTION

Figure 1:
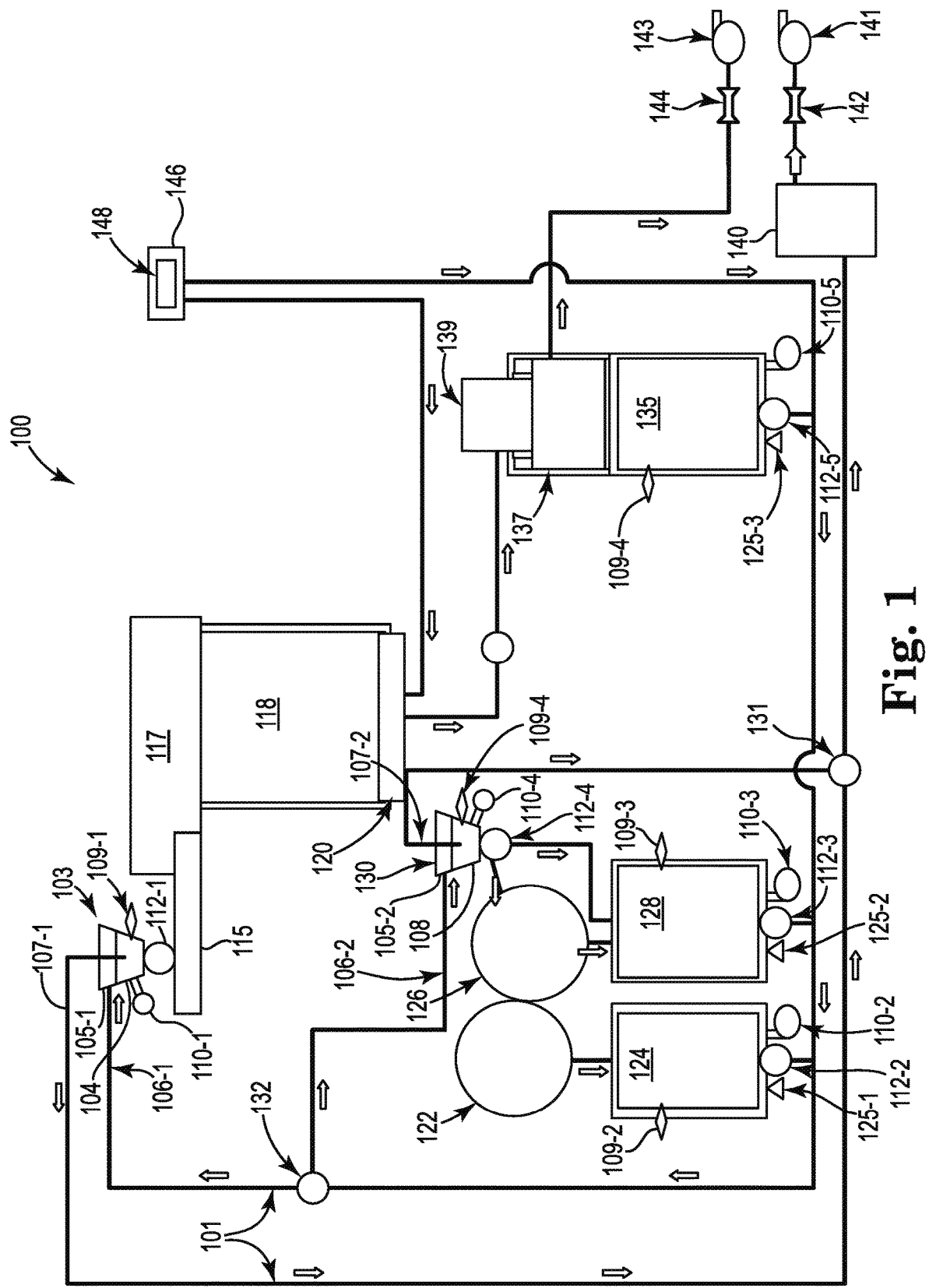
FIG. 1 illustrates a schematic view of an example of a system to deliver different mixtures of build materials during a 3D print operation consistent with the disclosure.

Example implementations in the disclosure relate to different mixtures of build materials being deliverable (e.g., delivered) during a 3D print operation. The different mixtures of build materials may be delivered from a delivery hopper to a print zone of a 3D print apparatus. A "hopper," as described herein, is intended to mean a container associated with storage of a build material (e.g., powder, powder-like, and/or short fiber materials, among other possible examples consistent with the disclosure) for additively building a 3D object by the 3D print apparatus. A plurality of hoppers of a print apparatus (e.g., for one or more types of unused (new) build materials and/or for recycling and/or reclaiming these unused build materials, as described herein) may enable more efficient and/or cost-effective use of the build materials (e.g., relative to utilizing only unused build material) during a 3D print operation. The plurality of hoppers may each be independently utilized as a source of a particular build material (e.g., unused, recycled, and/or reclaimed build materials) to satisfy a print protocol by, for example, combining the different build materials in different proportions (e.g., in particular ratios) for performance of a print 3D operation.

In some previous implementations of 3D printers, a pre-prepared build material or a mixture of build materials is used for completion of a total print operation (e.g., the pre-preparation of the mixture being performed in a build material management station separate from the 3D printer). As such, for example, unused build material may have been combined with recycled build material prior to using the combination for completion of an entire next 3D print operation (e.g., after completion of a prior 3D print operation that enabled recovery of the recycled build material). However, this may have limited the next 3D object to just being formed from the combination of, for example, the unused build material and the recycled build material. Because the mixture of the build materials is pre-mixed, one mixture of build materials may not be changed to another (e.g., different) mixture of build materials during a print operation, or at different portions of the print operation.

In contrast, as described herein, various different combinations (e.g., mixtures) of build materials may be utilized during a single print operation or at different portions of the print operation (e.g., on-the-fly) for formation of a single 3D object. For example, a mixture of 50% unused build material and 50% recycled build material, a mixture of 20% unused build material and 80% recycled build material, and a mixture of 80% unused build material and 20% recycled build material, among other possible mixtures described herein and otherwise, may be utilized on-the-fly for formation of a single 3D object. In some examples, recycled build material and/or reclaimed build material, as described herein, may be utilized (e.g., reused) in the same print operation in which the recycled and/or reclaimed build material was recovered, in contrast to the previous implementations.

FIG. 1 illustrates a schematic view of an example of a system deliver different mixtures of build materials during a 3D print operation consistent with the disclosure. In some examples, a system for performance of 3D print operations (e.g., as shown at 100 and described in connection with FIG. 1) may include a delivery hopper 103 to deliver build material to a print zone 117 of a 3D print apparatus. In some examples, the 3D print apparatus may include the delivery hopper 103, the print zone 117, and a delivery component 115 to deliver the mixtures of build material from the delivery hopper 103 to the print zone 117, a build area 118 of the print zone 117, a build zone 584 of the build area 118, and/or a controller 148 of the 3D print apparatus, among other possible components not shown for clarity.

As such, the system 100 may include the print apparatus. The system also may include a plurality of build material hoppers 124, 128, 135 to which the delivery hopper 103 may be connected (e.g., via pneumatic lines 101) for receipt of at least one of a corresponding plurality of build materials. For example, build material hopper 124 may be utilized for receipt, storage, and/or supply of unused build material, build material hopper 128 may be utilized for receipt, storage, and/or supply of recycled build material, and build material hopper 135 may be utilized for receipt, storage, and/or supply of reclaimed build material, as described herein. In various examples, there may be build material hoppers for unused, recycled, and/or reclaimed build materials corresponding to (e.g., dedicated to) a number of (e.g., each of) a plurality of different types of build materials. The different types of build materials may have different characteristics (e.g., chemical composition, density, solubility, strength, binding, susceptibility to laser etching, porosity, and/or color, among other differing characteristics) that may affect performance of the 3D print operation according to the particular print protocol.

An interior volume 104 of the delivery hopper 103 may be formed to contain enough build material sufficient to form a predetermined number of layers associated with formation of a 3D object following delivery of the build material to the print zone 117. The controller 148 of the 3D print apparatus may direct that variable proportions of a first build material relative to a second build material are receivable (e.g., received) by the delivery hopper 103 from the plurality of build material hoppers 124, 128, 135 during the 3D print operation. As described herein, being "associated with" formation of a 3D object is intended to include, for example, utilizing build materials, layers, regions, etc., that correspond to insulator regions (e.g., as shown at 582, 586, and/or 589 and described in connection with FIG. 5) associated with the formation of the 3D object (e.g., associate with the interior region 584 in which the defined structure 587 of the 3D object is formed).

Different mixtures of the variable proportions of the first build material and the second build material may be delivered to the delivery hopper 103 during the 3D print operation. As described herein, the variable proportions of the first build material and the second build material may be adequately mixed in the pneumatic lines 101 prior to receipt of the build material by the delivery hopper 103. To further contribute to mixing the first build material and the second build material, the delivery hopper 103 may, in some examples, mix (e.g., using a mixing component 110-1) the received variable proportions prior to delivery of the variable (different) mixtures of the build materials to the print zone 117 during the 3D print operation. The received variable proportions may, for example, be 80% of recycled build material and 20% of unused build material, 20% of recycled build material and 80% of unused build material, or 100% of recycled build material and 0% of unused build material, among other examples of variable proportions, which may be mixed in the pneumatic lines 101 and/or by the mixing component 110-1 to form individually different mixtures. As described herein, the different mixtures of the plurality of build materials received from the corresponding plurality of build material hoppers 124, 128, 135 may be utilized to form different regions associated with a 3D object (e.g., different views of the regions shown at 580 and described in connection with FIG. 5) in the print zone 117 (e.g., in the build area 118 of the print zone 117).

As shown in FIG. 1, a sensor 109-1 may be connected to the delivery hopper 103 to determine that at least one of the corresponding plurality of build materials received by the delivery hopper 103 is sufficient to form (e.g., to form no more than and/or to form substantially equal to) the predetermined number of layers of the 3D object. For example, the sensor 109-1 may determine (e.g., visually, mechanically, electrically, and/or acoustically, etc.) that one or a mixture of more than one of the build materials received by the delivery hopper 103 has a volume and/or mass corresponding to formation of the predetermined number of layers.

In various examples, the interior volume of the delivery hopper 103 may be adjusted (e.g., by replacement of the delivery hopper with another delivery hopper and/or by electronically/mechanically adjusting position and/or shape of a number of structural components of a single delivery hopper, etc.) to correspond to the volume and/or mass of the predetermined number of layers sufficient to form the predetermined number of layers of the 3D object. As described herein, composition of a total number of layers formed from the build materials utilized to in association with formation of a completed 3D object may vary at different levels (e.g., layers) and/or positions (e.g., regions as described herein) associated with the 3D object such that corresponding proportions of the plurality of build materials received by the delivery hopper 103 also may vary accordingly during formation of the complete 3D object.

The plurality of hoppers of the system 100 may include a first build material hopper 124 as a source of an unused (new) build material. The unused build material hopper 124 may be connected to new build material container 122. The new build material container 122 may supply the unused build material to the unused build material hopper 124 to enable delivery of the unused build material from the delivery hopper 103 to the print zone 117 in order to be utilized in various 3D print operations.

The plurality of hoppers of the system 100 also may include a second build material hopper 128 as a source of a recycled build material. When the sensor 109-1, for example, indicates that a volume of the delivery hopper 103 is filled with build material sufficient for formation of the predetermined number of layers associate with the 3D object, the feeder mechanism 112-2 of the unused build material hopper 124, the feeder mechanism 112-3 of the recycled build material hopper 128, and/or the feeder mechanism 112-5 of the reclaimed build material hopper 135 may be inactivated (e.g., as directed by instructions from controller 148) such that delivery of build material to the delivery hopper 103 is halted based upon the delivery hopper 103 being sufficiently filled.

The system 100 also may include a recycle hopper 130 to receive build material propelled pneumatically from the plurality of build material hoppers through the pneumatic lines 101 prior to receipt of the build material by the delivery hopper 103. A pneumatic diverter valve 132 may be selectively switched (e.g., as directed by instructions from controller 148) such that (e.g., at completion of a print operation) build material may be diverted from being propelled toward an input conduit 106-1 of the filled delivery hopper 103 to being propelled toward an input conduit 106-2 of the recycle hopper 130. The build material may, for example, be redirected, via the recycle hopper 130, from delivery to the delivery hopper 103. Build material diverted from the delivery hopper 103 to the recycle hopper 130 may have been propelled pneumatically via pneumatic lines 101 from the unused build material hopper 124, the recycled build material hopper 128, and/or the reclaimed build material hopper 135.

For example, when a print operation is completed, the reclaimed build material may be sent from the reclaimed build material hopper 135 to the recycled build material hopper 128 and/or a connected recycled supply container 126. Alternatively or in addition, when a build material is changed to a different type of build material previous to, during, and/or after a print operation, remaining build materials may be removed from the unused build material hopper 124, the recycled build material hopper 128, and/or the reclaimed build material hopper 135 (e.g., as directed by instructions from controller 148) to be sent via the recycle hopper 130 to, for example, the recycled supply container 126 (e.g., for removal from the system 100 and/or to substantially empty of the build material hoppers 124, 128, and/or 135 for the feeder mechanism 112-2 of the different type of build material.

Following delivery of such build materials to the recycle hopper 130, the build materials may be sent for receipt, storage, and/or recycling to the recycled build material hopper 128 (e.g., regardless of whether the build material originally was propelled from the unused build material hopper 124, the recycled build material hopper 128, and/or the reclaimed build material hopper 135). In some examples, the recycled build material may be sent to a connected recycled supply container 126 in addition to, or in place of the recycled build material being sent to the recycled build material hopper 128. The recycled supply container 126 may be replaceable such that a recycled supply container 126 may be removed for storage of the recycled build material elsewhere when filled to an intended capacity and/or a recycled supply container 126 may be connected to the recycled build material hopper 128 to supply recycled build material for a 3D print operation (e.g., when a previous recycled supply container 126 is empty and/or is being replaced).

The build material may be sent to the recycled supply container 126 and/or the recycled build material hopper 128 based upon a sensor 109-4 connected to the recycle hopper 130 determining that a volume of the recycled build material within an interior volume 108 therein is suitable for being sent to the recycled supply container 126 and/or the recycled build material hopper 128. Similar to sensor 109-1, the sensor 109-4 may determine that the volume is suitable visually, mechanically, electrically, and/or acoustically, etc. In contrast to the delivery hopper 103, the recycle hopper 130 may not be limited to having an internal volume 108 that corresponds to the volume and/or mass of the predetermined number of layers sufficient to form the predetermined number of layers of the 3D object. The delivery hopper 103 may have an internal volume 104 corresponding to a volume and/or mass of build material sufficient to form 1, 2, 3, . . . , N layers of the 3D object when delivered to the print zone 117 and the recycled build material hopper 128 may have an internal volume sufficient to form, or contribute to formation, in combination with the unused and/or reclaimed build material, M layers of the 3D object. The recycle hopper 130 may, in contrast, have an internal volume 108 sufficient to form between N and M layers such that the recycle hopper 130 may contain a volume of build material that is greater than that of the delivery hopper 103 and less than that of the recycled build material hopper 128.

The plurality of hoppers of the system 100 also may include a third build material hopper 135 as a source of a reclaimed build material. The reclaimed build material may be delivered to the reclaimed build material hopper 135 by reclamation of non-solidified or unfused build material from the print zone 117 and/or the build area 118 of the print zone 117 previous to, during, and/or after completion of a 3D print operation therein. The non-solidified or unfused build material may be at least one of the unused build material, the recycled build material, and/or the reclaimed build material delivered from the delivery hopper 103 to the print zone 117 for the 3D print operation. For example, the build area 118 may have a movable build platform 120 associated with and/or functioning as a floor of the build area 118. The movable build platform 120 may be raised and lowered (e.g., as directed by instructions from controller 148) to enable formation of appropriate thicknesses for the various layers and/or regions associate with the 3D object. In some examples, the movable build platform 120 may be associated with, or include, a number of vents (not shown) and/or a vibratory motor (not shown) to enable reclamation of the non-solidified or unfused build material from the build area 118. For example, a reclaim blower 143, possibly associated with a venturi 144, may be connected to the pneumatic lines 101 of system 100 and utilized to create a vacuum by drawing gas (e.g., "gas" as used herein may be air or any suitable single gas or combination of gases) past the vents of the movable build platform 120 (e.g., as indicated by the arrows in the associated pneumatic lines 101). In some examples, the print zone 117 also may include a number of vents and/or a vibratory motor (not shown) to enable reclamation of the non-solidified or unfused build material from the print zone 117.

The reclaimed build material may be propelled by vacuum-induced gas flow through the pneumatic lines 101 for collection within the reclaimed build material hopper 135. In some examples, the reclaimed build material may be propelled into a separation chamber 139 connected to the reclaimed build material hopper 135. The separation chamber 139 may include various features (e.g., a centrifugal separator to apply centrifugal force, among other features) designed to promote separation of the gas by which the build material was propelled from the build material itself. In some examples, the reclaimed build material hopper 135 may be connected to various filters and/or sieves 137 between the separation chamber 139 and the reclaimed build material hopper 135, or instead of the separation chamber 139, to reduce (e.g., prevent) large conglomerates of non-solidified, unfused, and/or partly solidified or fused build material from entering the reclaimed build material hopper 135.

The reclaim blower 143 connected to the pneumatic lines 101 may create the vacuum by drawing gas as output via the pneumatic lines 101. Input of the gas to the pneumatic lines 101 may be enabled by an input component 146. The input component 146 may be, or may be associated with, a filter component (not shown) (e.g., a high efficiency particulate air (HEPA) filter or an ultra-low penetration air (ULPA) filter, among other types of filters) to reduce (e.g., prevent) contamination of the system 100 and components within the system.

In some examples, the input component 146 also may be, or may include, a compartment in which the controller 148 may be positioned. A such, the controller 148 may be kept uncontaminated in addition to gas flow past the controller cooling the electronic circuitry of the controller 148. The controller 148 may be electrically connected (not shown) to the various selectively functional components of the system 100. For example, the controller 148 may be electrically connected to selectively functional components of the delivery hopper 103, the feeder mechanism 112, the delivery component 115, the print zone 117, the build area 118, the build platform 120, the recycle hopper 130, the unused build material hopper 124, the recycled build material hopper 128, and/or the reclaimed build material hopper 135, among other selectively functional components.

The delivery component 115 may, in some examples, deliver one of the plurality of build materials and/or a mixture of at least two of the build material one at a time to the print zone 117. For example, a ribbon carriage (not shown) of the delivery component 115 may carry a defined quantity of build material (e.g., an equivalent of one layer associate with the 3D object), which has been deposited on the ribbon carriage from the feeder mechanism 112-1 of the delivery hopper 103, to an edge of the print zone 117. The delivery component 115 may deposit the defined quantity of build material at the edge of the print zone 117. A roller (not shown) associated with the delivery component 115 and/or the print zone 117 may spread the build material over the build platform 120 in the build area 118 (e.g., to a predefined layer thickness of a single particle of the build material or a multiple thereof) with the movable build platform 120 appropriately positioned at a level to facilitate spreading to such a layer thickness. This implementation of the delivery component 115 is presented by way of example and not by way of limitation. That is, build material may be delivered from the delivery hopper 103 and utilized in the print zone 117 in other suitable implementations.

Selected portions of such a layer may be solidified and/or fused together and/or to an underlying layer through selective exposure to a binding material and/or a fusing agent to absorb energy and/or radiation in order to enable printing of a layer of a 3D object. Unsolidified and/or unfused build material may be removed (e.g., reclaimed) and, in some examples, another defined quantity of the build material may be spread over the already fused layer and/or the build platform 120 to form another layer (e.g., possibly being formed from different build materials and/or different mixtures thereof than the underlying layer). Multiple layers may be formed as such until the completed 3D object has been formed in the 3D print operation.

As described herein, a lower layer or a lower plurality of layers may be formed (e.g., adjacent to or contiguous with an upper surface of the build platform 120) from (e.g., only from) the recycled build material and/or the reclaimed build material as at least a portion of an exterior region (e.g., as shown at 582-1 and described in connection with FIG. 5). The layers of the recycled build material and/or the reclaimed build material may serve as a thermal insulator to, for example, reduce loss of energy and/or heat from portions of the 3D object subsequently built thereon. Such reduction of energy and/or heat loss may promote uniform solidification or fusion of either an unused build material or a mixture of the unused build material with the recycled build material and/or the reclaimed build material utilized to form a portion of a 3D-printed object on top of the insulator layer or layers. In some examples, an upper layer or an upper plurality of layers formed from (e.g., only from) the recycled build material and/or the reclaimed build material may be formed on top of the portion of the 3D object formed from the unused build material or the mixture of build materials to further serve as an insulator to additionally reduce loss of energy and/or heat from the portion of the 3D object.

Utilizing the recycled build material and/or the reclaimed build material as such may be more efficient and/or cost-effective than utilizing the unused build material (e.g., only the unused build material) or a mixture of build materials that includes at least some proportion of the unused build material for the insulator layer or layers. Further contributing to the efficiency and/or cost-efficacy may be that the insulator layer or layers may be removed and/or discarded after promoting uniform solidification and/or fusion in order to create a completed 3D object (e.g., suitable for sale and/or to perform a particular function). For example, it may be unnecessarily costly to utilize the unused build material, rather than the recycled build material and/or the reclaimed build material, for regions associated with the 3D object that are intended to be removed and/or discarded.

For example, as described in connection with FIG. 5, insulator regions 582, 586, and/or 589 may be formed in association with (e.g., in contact with) a build zone 584 (e.g., a portion and/or volume within build area 118 shown and described in connection with FIG. 1) in which a 3D object is to be formed. The build zone 584 may correspond to the "interior region" shown at 584 in FIG. 5 and described in connection with FIGS. 5 and 6. The insulator regions 582, 586, and/or 589 may be formed in association with an exterior surface of the build zone 584 in order to promote the uniform solidification or fusion of the portion of the build material intended (e.g., by being exposed to a binding material and/or a fusing agent) to form the 3D object (e.g., as indicated at 587 by cross-hatching). The white (e.g., not cross-hatched) portion of the build zone 584 is intended to represent build material that will not become solidified or fused (e.g., by not being exposed to a binding material and/or a fusing agent). In various examples, the non-solidified or unfused build material from the build zone 584 may be recovered (e.g., as recycled build material and/or reclaimed build material described herein). The insulator regions 582, 586, and/or 589 also are intended to be formed from build material that will not become solidified or fused (e.g., as indicated by not being cross-hatched) and the non-solidified or unfused build material thereof also may be recovered by being removed from an exterior of the build zone 584 and/or from the completed 3D object after completion of the 3D print operation (e.g., along with the non-solidified or unfused build material from the build zone 584).

As described in connection with FIG. 2, the delivery hopper 103, the recycle hopper 130, the unused build material hopper 124, the recycled build material hopper 128, and/or the reclaimed build material hopper 135 may include, or be connected to, a feeder mechanism 112 (e.g., including a drive motor). For example, the delivery hopper 103 may include feeder mechanism 112-1, the unused build material hopper 124 may include feeder mechanism 112-2, the recycled build material hopper 128 may include feeder mechanism 112-3, the recycle hopper 130 may include feeder mechanism 112-4, and/or the reclaimed build material hopper 135 may include feeder mechanism 112-5.

In various examples, the delivery hopper 103, the recycle hopper 130, the unused build material hopper 124, the recycled build material hopper 128, and/or the reclaimed build material hopper 135 may include, or be connected to, a mixing component 110 to mix the build material and/or mixtures of build materials contained therein to promote a substantially uniform mixture of the build material or mixtures of build materials. In some examples, the mixing component 110 may include, be associated with, or be replaced by an aerator pump (not shown) to reduce (e.g., prevent) compaction and/or solidification of the build material therein. The mixing component 110 and/or the aerator pump may promote efficient and/or uniform delivery of defined units (e.g., dollops) of the build material by the feeder mechanisms 112. For example, the delivery hopper 103 may include mixing component 110-1, the unused build material hopper 124 may include mixing component 110-2, the recycled build material hopper 128 may include mixing component 110-3, the recycle hopper 130 may include mixing component 110-4, and/or the reclaimed build material hopper 135 may include mixing component 110-5. The mixing components 110 may further include, or be associated with, a puffer aerator (not shown) to, for example, contribute to build material flowability, prevent and/or disrupt connections (e.g., arches, bridges, etc.) formed in and/or by the build material that may affect the build material flowability, contribute to leveling of an upper surface of the build material in a hopper, clear a surface of a sensor 109, and/or further promote mixing.

In various examples, the delivery hopper 103, the recycle hopper 130, the unused build material hopper 124, the recycled build material hopper 128, and/or the reclaimed build material hopper 135 may include, or be connected to, a sensor 109 to determine a volume, as described herein, of build material in the interior volume of the respective hopper. For example, the delivery hopper 103 may include sensor 109-1, the unused build material hopper 124 may include sensor 109-2, the recycled build material hopper 128 may include sensor 109-3, the recycle hopper 130 may include sensor 109-4, and/or the reclaimed build material hopper 135 may include sensor 109-5.

As described in connection with FIGS. 3 and 4, the unused build material hopper 124, the recycled build material hopper 128, and/or the reclaimed build material hopper 135 may include, or be connected to, a load cell 125 to determine a mass of build material, which may correspond to a volume of the particular type of build material, in each of the interior volumes of the unused build material, the recycled build material, and/or the reclaimed build material hoppers. For example, the recycled build material hopper 128 may include load cell 125-1, the recycle hopper 130 may include load cell 125-2, and/or the reclaimed build material hopper 135 may include load cell 125-3. A load cell 125 may provide an analog and/or digital measurement (e.g., numerical output) corresponding to the mass and/or volume of build material contained in the interior volume of the respective build material hopper 124, 128, and/or 135.

As described herein, the delivery hopper 103, the print zone 117, the build area 118, the build zone 584, the plurality of build material hoppers 124, 128, 135, the recycle hopper 130 to deliver the recycled build material to the second build material hopper 128, and/or the input component 146 (e.g., with the controller 148 therein) may be connected via a pneumatic conveyance system. The pneumatic conveyance system may be structured to pneumatically propel the build materials and/or mixtures thereof between components of system 100 to enable formation of a 3D object.

As described in connection with FIGS. 3 and 4, the delivery hopper 103 may be connected to an input conduit 106-1 of the pneumatic lines 101. Defined units of build material (e.g., resulting from "dollops" as described in connection with feeder mechanism 212 shown in FIG. 2) may be propelled from the build material hoppers 124, 128, and/or 135 through the input conduit 106-1 by pneumatic gas flow into an upper portion 105-1 of the delivery hopper 103. The recycle hopper 130 may be connected to an input conduit 106-2 of the pneumatic lines 101 (e.g., as controlled and/or switched by pneumatic diverter valve 132) for alternative receipt of the defined units of build material propelled from the build material hoppers 124, 128, and/or 135 into an upper portion 105-2 of the recycle hopper 130.

At least one of the upper portion 105-1 of the delivery hopper 103 and the upper portion 105-2 of the recycle hopper 130 may be structured to apply centrifugal force (e.g., lack of centripetal force) to the build material input through the respective input conduit 106-1, 106-2, as propelled by the gas used in the pneumatic conveyance system, to promote settling of the build material in order to promote separation of the build material and the gas. Promoting the separation of the build material and the gas as such may reduce (e.g., prevent) output of the build material through an output conduit for the gas (e.g., gas output conduit 107-1 for the delivery hopper 103 and/or gas output conduit 107-2 for the recycle hopper 130).

As described in connection with FIGS. 3 and 4, the centrifugal force may promote settling of the defined units from the upper portion 105-1 of the delivery hopper 103 into a lower portion of the delivery hopper 103 (e.g., the lower portion being the internal volume 104 of the delivery hopper 103) without being propelled by the pneumatic gas flow as output via the gas output conduit 107-1. In some examples, the centrifugal force also may promote settling of the defined units from the upper portion 105-2 of the recycle hopper 130 into a lower portion of the recycle hopper 130 (e.g., the lower portion being the internal volume 108 of the recycle hopper 130) without being propelled by the pneumatic gas flow as output via the gas output conduit 107-2. The lower portion 108 of the recycle hopper 130 may, in some examples, have a conical or frustoconical shape that has larger internal volume, a larger circumference, and/or a larger height than a conical or frustoconical shape of the lower portion 104 of the delivery hopper 103. This may correspond to an increased number of layers capable of being formed from the build material in the recycled hopper 130 compared to the number of layers capable of being formed from the build material in the delivery hopper 103. The upper portion 105-2 of the recycle hopper 130 may, in various examples, be corresponding larger than that of the upper portion 105-1 of the delivery hopper 103 or (e.g., if both hoppers have the same circumference) the upper portion 105-2 of the recycle hopper 130 may be the same size as that of the upper portion 105-1 of the delivery hopper 103.

A delivery and recycle blower 141, possibly associated with a venturi 142, may be connected to the pneumatic lines 101 of system 100 and utilized to create a pneumatic gas flow through the associated pneumatic lines 101 (e.g., a direction of the gas flow indicated by the arrows in the associated pneumatic lines 101). In some examples, a filter 140 (e.g., in a filter box) may be positioned upstream in the gas flow from the venturi 142 and/or the delivery and recycle blower 141 of the pneumatic conveyance system. The filter 140 may, in various examples, be a HEPA filter or an ULPA filter, among other types of filters, to reduce (e.g., prevent) output of propelled build material from the system 100 and/or input of the propelled build material into other components of the system (e.g., delivery and recycle blower 141 and/or venturi 142, among other components). In some examples, input of a gas for the pneumatic conveyance system may be provided through the input component 146 described in connection with the reclaim blower 143, although input of gas to enable a pneumatic flow provided by delivery and recycle blower 141 may be through a filter other than that associated with input component 146.

Output of the gas flow provided by the delivery and recycle blower 141 may draw gas through the gas output conduit 107-1 for the delivery hopper 103 and/or the gas output conduit 107-2 for the recycle hopper 130. Whether the gas flow is through the gas output conduit 107-1 for the delivery hopper 103 or the gas output conduit 107-2 for the recycle hopper 130 may be determined utilizing a T- or Y-shaped fitting 131 that, depending on a selectively switched position of the pneumatic diverter valve 132 (e.g., as directed by instructions from controller 148), may cause diversion of the gas flow from being drawn through the gas output conduit 107-1 for the delivery hopper 103 to being drawn through the gas output conduit 107-2 for the recycle hopper 130. Selectively diverting the gas flow through the gas output conduit 107-1 for the delivery hopper 103 may enable build material from the build material hoppers 124, 128, and/or 135 to be propelled through the input conduit 106-1 into the upper portion 105-1 of the delivery hopper 103. In contrast, selectively diverting the gas flow through the gas output conduit 107-2 for the recycle hopper 130 (e.g., in addition to appropriate selective switching of the pneumatic diverter valve 132) may enable build material from the build material hoppers 124, 128, and/or 135 to be propelled through the input conduit 106-2 into the upper portion 105-2 of the recycle hopper 130.

Accordingly, the flow of gas input through, for example, the input component 146 and output by the delivery and recycle blower 141 of the pneumatic conveyance system may selectively enable build material to be input to either the delivery hopper 103 or the recycle hopper 130. Input of the build material may be selectively sourced from the unused build material hopper 124, the recycled build material hopper 128, and/or the reclaimed build material hopper 135 during performance of a 3D print operation. Hence, the unused build material, the formerly unused build material (which is now recycled), previously recycled build material, and/or reclaimed build material may be recovered (e.g., via the recycle hopper 130 sending these build materials to the recycled build material hopper 128) for reuse in the same 3D print operation in which they were recovered.

Figure 2:
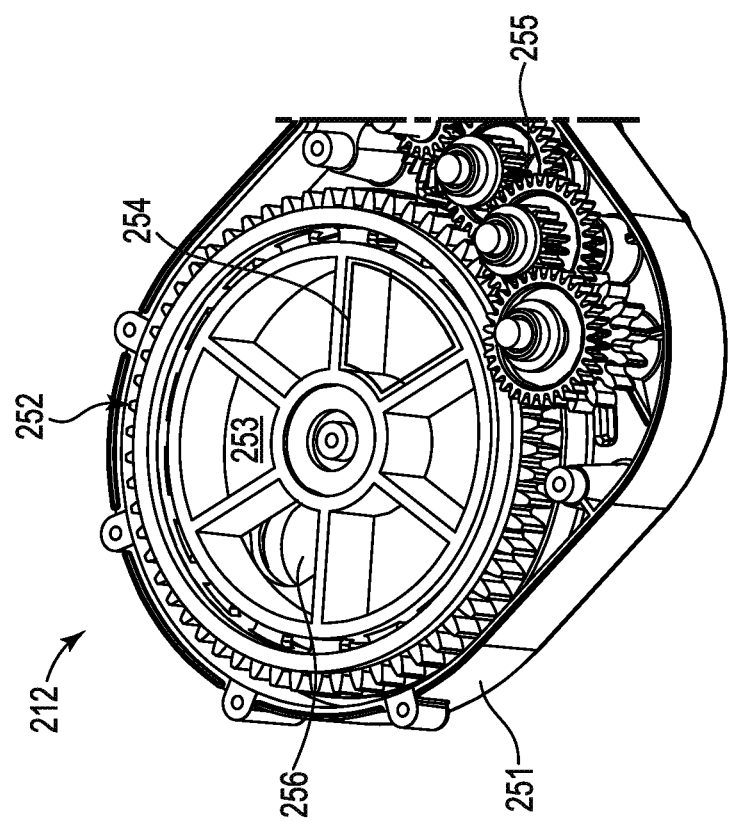
FIG. 2 illustrates a perspective view of an example of a portion of a feeder mechanism for build material consistent with the disclosure.

FIG. 2 illustrates a perspective view of an example of a portion of a feeder mechanism for build material consistent with the disclosure. The portion of the feeder mechanism 212 illustrated in in FIG. 2 may represent the selectively functional components of any of the feeder mechanisms 112-1, 112-2, 112-3, 112-4, and/or 112-5 shown and described in connection with FIG. 1.

Feeder mechanism 212 may be formed within a housing 251. The feeder mechanism 212 may include a rotatable disk 252 of a selected thickness within the housing 251. In some examples, the rotatable disk 252 may have gear teeth (e.g., along an outer circumference thereof, among other possible locations) to enable rotation of the rotatable disk 252 (e.g., around a fixed axis) via a motor (not shown) and corresponding gears of a rotation component 255. The rotatable disk 252 may have a number of compartments 253 (e.g., 2, 4, 6, . . . N compartments, including odd numbers) positioned between the outer circumference thereof and the axis. In some examples, each compartment 253 may be formed in a shape of a pie slice (e.g., truncated at the center point to accommodate the axis) with a thickness (e.g., depth) corresponding to the selected thickness of the rotatable disk 252, although other shapes and/or thicknesses for the compartments are contemplated within the disclosure.

Each layer associated with a 3D object formed in the print zone 117 of the disclosure may utilize, for example, build material in a range of from around 5 grams (g) to around 50 g. In an example in which the delivery hopper 103 has an internal volume 104 of the lower portion selected to contain enough build material to form 8 layers (e.g., 40-400 g of build material), each compartment 253 of the rotatable disk 252 in the feeder mechanism 212 may be selected (e.g., structured) to include a volume to receive, contain, and/or move 1-4 g of build material.

Figure 3:
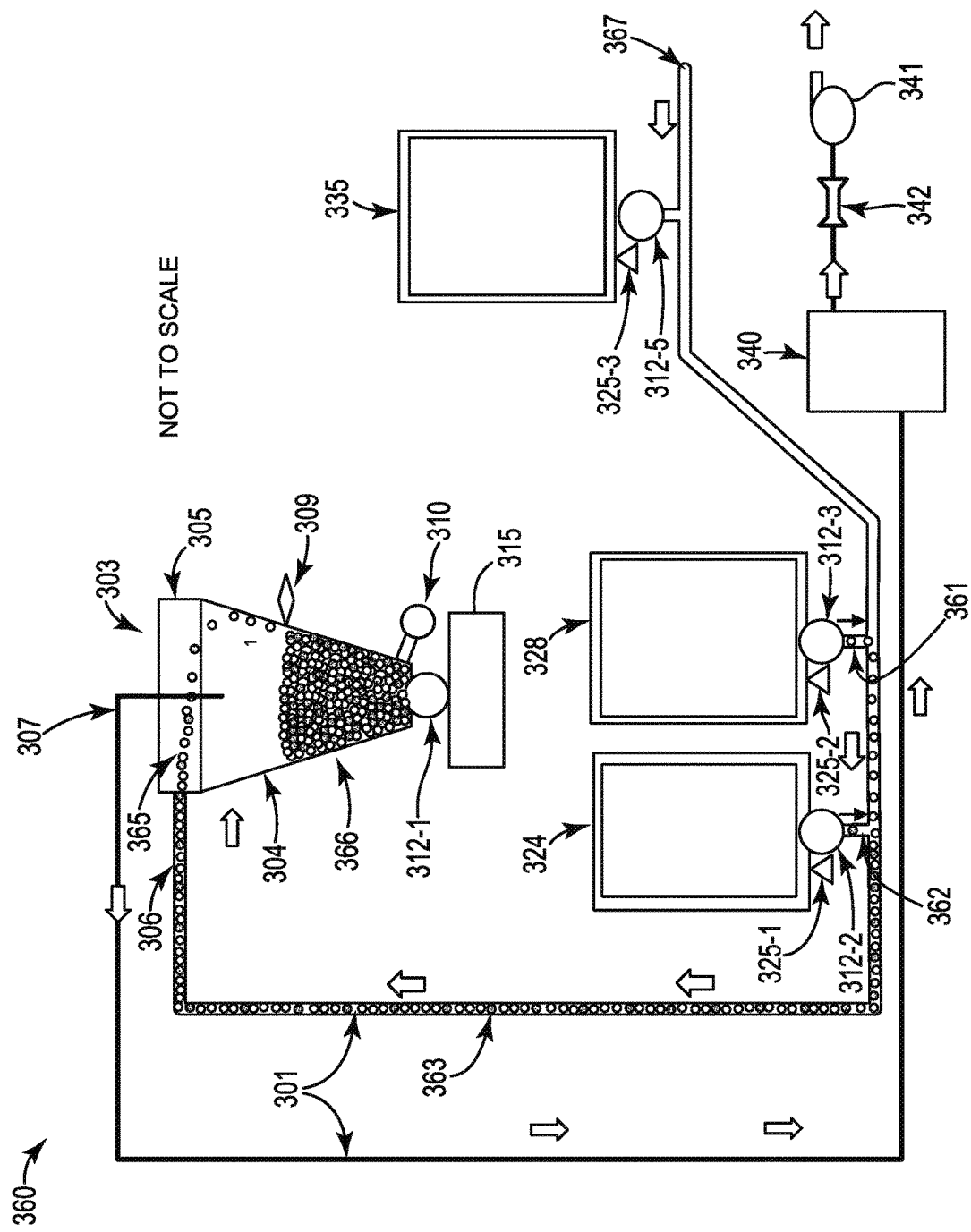
FIG. 3 illustrates another schematic view of an example of a system operated to deliver a predetermined mixture of build materials during a 3D print operation consistent with the disclosure.
Figure 4:
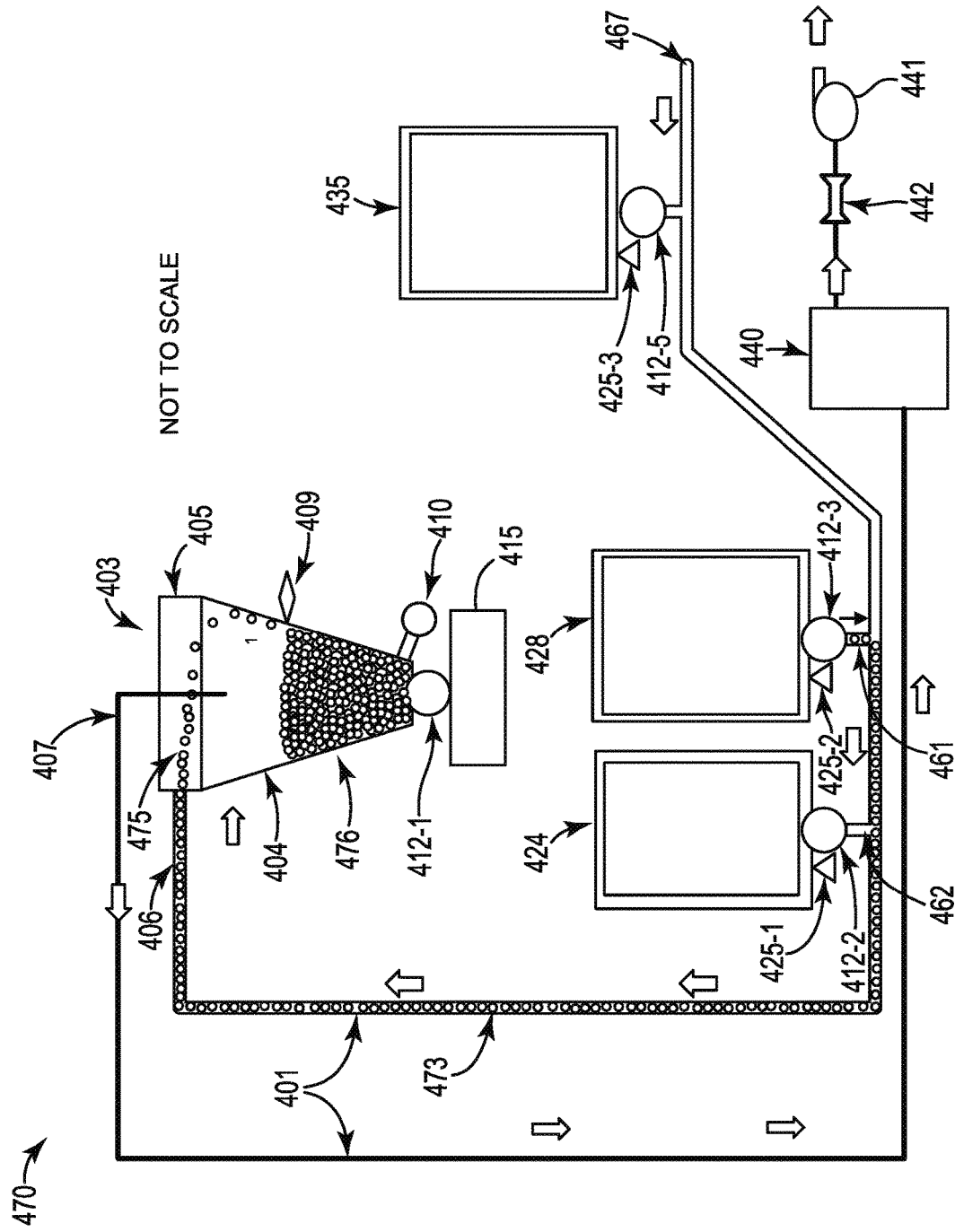
FIG. 4 illustrates another schematic view of an example of a system operated to deliver a predetermined build material during a 3D print operation consistent with the disclosure.

As shown in FIGS. 1, 3, and 4, each feeder mechanism 212 of the disclosure may be positioned at, or in association with, a bottom portion of a respective build material hopper. The bottom portion of each of the respective build material hoppers may have an opening (e.g., a hole) through which the build material contained therein may be accessed by the associated feeder mechanism 212. The contained build material may be accessed via gravity and/or pressure from the pneumatic gas flow, among other possible contributors (e.g., an aerator pump), propelling the build material through the opening and through an access port 254 (e.g., in a top of the housing 251) into a substantially empty compartment 253 of the rotatable disk 252 aligned with the access port 254. Each compartment 253 may have an open top to enable the build material to be propelled into the substantially empty compartment 253.

The rotatable disk 252 of the feeder mechanism 212 may be rotated via the rotation component 255. For example, the gear teeth along the outer circumference of the rotatable disk 252 may be engaged by complementary gear teeth of the rotation component 255. As illustrated in FIG. 2, the rotation component 255 may include a number of gears that may be selectively utilized (e.g., as directed by instructions from controller 148) to rotate the rotatable disk 252 at a plurality of selectable speeds (e.g., rotations per minute (rpm)).

A compartment 253 that has been substantially filled with build material through the access port 254 may be rotated (e.g., via rotation of the rotatable disk 252 clockwise or counter-clockwise) until the filled compartment aligns with a delivery port 256. The build material contained in the aligned compartment 253 may be delivered via gravity and/or pressure from the pneumatic gas flow, among other possible contributors, propelling the build material through the opening and through the delivery port 256 (e.g., in a bottom of the housing 251) into an entry point of a pneumatic line (e.g., as shown at 361 and 461 for the recycled build material hopper 328 and 428 in FIGS. 3 and 4, respectively, and at 362 and 462 for the unused build material hopper 324 and 424 in FIGS. 3 and 4, respectively). Alternatively, the build material contained in the aligned compartment 253 of the feeder mechanism 212 of the delivery hopper 103 (e.g., as shown at 112-1, 312-1, and 412-1) may be delivered through the delivery port 256 to the delivery component 115 shown in and described in connection with FIG. 1 in order to deliver mixtures of build material from the delivery hopper 103 to the print zone 117. Each compartment 253 may have an open bottom to enable the build material to be propelled through the delivery port 256 of the aligned compartment 253.

In various examples, the feeder mechanism 112-2 of the unused build material hopper 124, the feeder mechanism 112-3 of the recycled build material hopper 128, and/or the feeder mechanism 112-5 of the reclaimed build material hopper 135 may be selectively utilized to deliver different mixtures of build materials (e.g., to delivery hopper 103 and/or print zone 117) during a 3D print operation. The feeder mechanisms of each of the build material hoppers 124, 128, and 135 may be selectively operated at an rpm determined (e.g., predetermined) to deliver an appropriate amount of build material to the respective entry point of the pneumatic line in order to deliver a selectively determined proportion of each build material to the delivery hopper 103 (e.g., the proportion of each build material determined by a print protocol directed by controller 148).

FIG. 3 illustrates another schematic view of an example of a system operated to deliver a predetermined mixture of build materials during a 3D print operation consistent with the disclosure. The system 360 illustrated in FIG. 3 and the system 470 illustrated in FIG. 4 may correspond to the system 100 shown and described in connection with FIGS. 1 and 2. Some elements shown in FIG. 1 may be eliminated from FIGS. 3 and/or 4 for purposes of clarity; however, all elements of the system 100 shown in FIG. 1 are intended to be included in the systems 360, 470 shown in FIGS. 3 and 4 except where explicitly described otherwise. For example, in some examples of the disclosure, a single blower 341, possibly associated with a venturi 342 and a filter 340, may be utilized in a pneumatic conveyance system to create a pneumatic gas flow in association with a single pneumatic input line 367. In some examples, the single pneumatic input line 367 may be connected to, or associated with, the input component 146 (filter) and/or controller 148 shown and described in connection with FIG. 1.

As indicated in FIGS. 3 and 4, components of the respective systems 360. 470 are not shown to scale. For example, as described in the disclosure, an interior volume 304, 404 of the delivery hopper 303, 403 is substantially smaller (e.g., 3-1000 times smaller) than an interior volume of the unused build material hopper 324, 424, the recycled build material hopper 328, 428, and/or the reclaimed build material hopper 335, 435.

The proportions of each of the different build materials deliverable (e.g., delivered) to the delivery hoppers 303, 403 shown in FIGS. 3 and 4 may correspond to the particular rpm at which the respective feeder mechanism 212 shown and described in connection with FIG. 2 is selectively operated. For example, as shown in FIG. 3, the feeder mechanism 312-3 of the recycled build material hopper 328 may be selectively operated at an rpm determined to deliver (e.g., as indicated by an arrow) a number of defined units (e.g., a number of dollops corresponding to a respective number of interior volumes of compartments 253) of recycled build material to the entry point 361 of the pneumatic line 301. The feeder mechanism 312-2 of the unused build material hopper 324 may be selectively operated at an rpm determined to deliver (e.g., as indicated by an arrow) a number of dollops, corresponding to a respective number of interior volumes of compartments 253, of unused build material to the entry point 362 of the pneumatic line 301. In some examples, timing of entry of the dollops from the plurality of build material hoppers may be coordinated such that entry of one dollop into the pneumatic time 301 is not simultaneous with passage of a dollop from another build material hopper past the entry point (e.g., to reduce or prevent interference between dollops entering into and/or passing in the pneumatic line 301).

In various examples, the feeder mechanism 312-5 of the reclaimed build material hopper 335 may be similarly selectively operated to deliver dollops (not shown) to the pneumatic line 301. As such, different mixtures and/or proportions of the unused build material and the recycled build material, the unused build material and the reclaimed build material, the recycled build material and the reclaimed build material, and/or the unused build material, the recycled build material, and the reclaimed build material may be delivered to the delivery hopper 303 to be utilized in forming layers associated with a 3D object in the print zone 117.

The dollops shown entering via feeder mechanisms 312-2 and 312-3 and being propelled by the pneumatic line 301 are illustrated for clarity as intact and separate physical entities. However, due to the physical structure of various build materials (e.g., powders, semi-powders, etc.), the chemical constituents (e.g., molecules) of the defined units of build material contributing to formation of the dollops may at least partially mix (e.g., intermingle) in the pneumatic line 301 during delivery to the delivery hopper 303.

An example of delivery to the delivery hopper 303 of a determined proportion of the recycled build material relative to the unused build material from the unused build material hopper 324 may be that the rpm of the feeder mechanism 312-3 of the recycled build material hopper 328 is selectively operated 4 times faster than the rpm of the feeder mechanism 312-2 of the unused build material hopper 328. This may result in an 80/20 proportion (e.g., a 4:1 ratio) of a mixture of the defined units of build material (e.g., as shown by way of illustration as dollops at 363) in the pneumatic line 301 being propelled through the input conduit 306 connected to the upper portion 305 of the delivery hopper 303. Any proportions of mixtures of build material from the unused build material hopper 324, the recycled build material hopper 328, and/or the reclaimed build material hopper 335 may be selectively directed as just described.

Because the volume of build material present in each of the build material hoppers 324, 328, and 335 may affect how easily and/or quickly (e.g., due to compaction of and/or downward pressure applied by build material on top of other build material, among other factors) the build material is accessed through the access port 254 and/or propelled through the delivery port 256, the rpm of feeder mechanism 312-2 and/or feeder mechanism 312-3 may be adjusted based on input from load cells 325-1 and 325-2, respectively. When reclaimed build material is being delivered to the delivery hopper 303, the feeder mechanism 312-5 and/or the load cell 325-3 may be selectively operated similarly.

As described herein, the upper portion 305 of the delivery hopper 303 may be structured to apply centrifugal force to the build material input through the input conduit 306 to promote settling of the build material in the lower portion 304 (e.g., internal volume) of the delivery hopper 303. For example, the input conduit 306 may be connected to the upper portion 305 of the delivery hopper 303 tangentially to an outer circumference of the upper portion 305 such that defined units of build material 365 are propelled so as to follow a trajectory around and in contact with the outer circumference of the upper portion 305. In addition, the output conduit 307 through which gas is pneumatically drawn may have a portion of the pneumatic line 301 that extends a determined distance below the upper portion 305 and into the lower portion 304 of the delivery hopper 303 in order to be displaced from the trajectory of the defined units around the outer circumference of the upper portion 305. Friction from being in contact with the outer circumference of the upper portion 305 may reduce a velocity of the defined units as they travel around the outer circumference and gravity may promote settling of the defined units along a wall of the internal volume of the lower portion 104 in order to promote separation of the build material and the gas. Promoting the separation as such may reduce (e.g., prevent) output of the build material through the output conduit 307 for the delivery hopper 303.

Accordingly, the different proportions of two different build materials (e.g., 80/20, among other proportions) input through the input conduit 306 may settle into the internal volume 304 of the lower portion of the delivery hopper 303 (e.g., as shown at 366) without being substantially affected by a gas flow outward through the output conduit 307. Mixing component 310 may be utilized to further mix the mixtures of build materials contained in the internal volume 304 to promote a substantially uniform mixture of the mixtures of build materials. In some examples, the mixing component 310 may include, be associated with, or be replaced by an aerator pump (not shown) to reduce (e.g., prevent) compaction and/or solidification of the build material therein. The mixing component 310 and/or the aerator pump may promote efficient and/or uniform delivery of the mixtures of defined units of the build material to the delivery component 315 by the feeder mechanism 312-1.

The mixture of defined units 366 shown in the internal volume 304 of the delivery hopper 303 are illustrated for clarity as intact and separate physical entities. However, due to the physical structure of various build materials, the chemical constituents of the defined units may have been at least partially mixed in the pneumatic line 301, in the upper portion 305, and/or in the lower portion 304 of the delivery hopper 303 during delivery to the lower portion 304.

A sensor 309 (e.g., as shown at 109-1 and described in connection with FIG. 1) may be connected to the delivery hopper 303 to determine that a mixture of build materials received by the delivery hopper 303 is sufficient to form the predetermined number of layers of the 3D object in the print zone 117 according to the print protocol. The sensor 309 may determine that the mixture of the build materials received by the delivery hopper 303 has a volume and/or mass corresponding to formation of the predetermined number of layers. For example, the sensor 309 may be utilized to determine that a volume and/or mass of an 80/20 proportion of recycled build material to unused build material in the delivery hopper 303 is sufficient to form a portion (e.g., as shown at 587 and described in connection with FIG. 5) associated with a 3D object as a predetermined number of layers of an interior region 584 (e.g., in contrast to an exterior region 582) associated with the 3D object.

The input conduit 106-2, the output conduit 107-2, the upper portion 105-2, the lower portion 108, the feeder mechanism 112-4, the mixing component 110-4, and/or the sensor 109-4 of the recycle hopper 130 shown and described in connection with FIG. 1 may be selectively operated similarly to the just-described selective operation of the delivery hopper 303. However, rather than delivery of build material to the delivery component 115, the components of the recycle hopper 130 may be structured for selectively sending recycled build material to either the recycled build material hopper 128 or the recycled supply container 126.

FIG. 4 illustrates another schematic view of an example of a system operated to deliver a predetermined build material during a 3D print operation consistent with the disclosure. The system 470 illustrated in FIG. 4 may correspond to the system 360 illustrated in FIG. 3 and the system 100 shown and described in connection with FIGS. 1 and 2. The components shown and described in connection with FIG. 4 may correspond to the same components, including the selectively functional components, shown and described in connection with FIG. 3.

FIG. 3 illustrates that various mixtures of the unused build material, the recycled build material, and/or the reclaimed build material may be delivered from their respective build material hoppers 324, 328, and/or 335 to the delivery hopper 303. In contrast, FIG. 4 illustrates the system 470 may be selectively operated to deliver just one of either the unused build material, the recycled build material, or the reclaimed build material from its respective build material hopper 424, 428, or 435 to the delivery hopper 403 to be utilized in forming layers associated with a 3D object in the print zone 117.

For example, as shown in FIG. 4, the feeder mechanism 412-3 of the recycled build material hopper 428 may be selectively operated at an rpm determined to deliver (e.g., as indicated by an arrow) a number of defined units (e.g., a number of dollops corresponding to a respective number of interior volumes of compartments 253) of recycled build material to the entry point 461 of the pneumatic line 301. The feeder mechanism 412-2 of the unused build material hopper 424 may be selectively operated so as to not rotate (e.g., at zero or substantially zero rpm) in order to not deliver (e.g., as indicated by lack of an arrow) dollops of the unused build material to the entry point 462 of the pneumatic line 401. The result may be that a 100/0 proportion of the recycled build material to the unused build material (e.g., as shown at 473) is in the pneumatic line 401 to be propelled 475 through the input conduit 406 connected to the upper portion 405 of the delivery hopper 403. In various examples, the system 470 may be selectively operated to deliver just one of either the unused build material, the recycled build material, or the reclaimed build material to be propelled 475 through the input conduit 406 connected to the upper portion 405 of the delivery hopper 403.

Accordingly, a single build material may be selectively determined (e.g., according to a print protocol directed by the controller 148) to be input through the input conduit 406 and settle into the internal volume 404 of the lower portion of the delivery hopper 403 (e.g., as shown at 476). As described in connection with FIG. 3, the single build material 476 may settle in the internal volume 404 of the lower portion of the delivery hopper 403 without being substantially affected by a gas flow outward through the output conduit 407. Mixing component 410 may be utilized to mix the single build material contained in the internal volume 404 to promote a substantially uniform mixture of the build material. The mixing component 410, which may include, or associated with, an aerator pump and/or a puffer aerator may promote efficient and/or uniform delivery of the mixture of defined units of the build material to the delivery component 415 by the feeder mechanism 412-1.

The mixture of defined units 476 of the same build material shown in the internal volume 404 of the delivery hopper 403 are illustrated for clarity as intact and separate physical entities. However, due to the physical structure of various build materials, the chemical constituents of the defined units may have been at least partially mixed in the pneumatic line 401, in the upper portion 405, and/or in the lower portion 404 of the delivery hopper 403 during delivery to the lower portion 404.

The sensor 409 (e.g., as shown at 109-1 and described in connection with FIG. 1) may be connected to the delivery hopper 403 to determine that the single build material received by the delivery hopper 403 is sufficient to form the predetermined number of layers associated with the 3D object in the print zone 117 according to the print protocol. The sensor 409 may determine that the single build material received by the delivery hopper 403 has a volume and/or mass corresponding to formation of the predetermined number of layers. For example, the sensor 409 may be utilized to determine that a volume and/or mass of a 100/0 proportion of recycled build material to unused build material in the delivery hopper 403 is sufficient to form a region (e.g., as shown at 582-1 and/or 582-2 and described in connection with FIG. 5) associated with a 3D object as an exterior region 582 (e.g., in contrast to an interior region 584) associated with the 3D object.

Accordingly, the systems described in connection with FIGS. 1-4 may include a 3D print apparatus having a delivery hopper 103, 303, 403 connected to a source of a first build material and a source of a second build material. For example, the source of the first build material may be the unused build material hopper 124, 324, 424 and the source of the second build material may be the recycled build material hopper 128, 328, 428. As described herein, the delivery hopper may be formed to contain enough build material sufficient to form a predetermined number of layers associated with formation of the object. For example, the delivery hopper may be formed to contain enough (e.g., only enough) build material sufficient to form ten (10) layers associated with the object.

The systems may include a controller 148 of the 3D print apparatus to direct performance of various operations based upon execution of print protocol instructions sent by the controller 148 to selectively functional components of the 3D print apparatus. The controller 148 may, for example, direct that a first quantity of the first build material and a second quantity of the second build material is receivable (e.g., received) by the delivery hopper. In some examples, the first build material may be an unused build material and the second build material may be a recycled build material. The first quantity of the first build material may, among various examples, be a first predetermined mass, volume, and/or number of dollops of the defined units of the unused build material and the second quantity of the second build material may be a second predetermined mass, volume, and/or number of dollops of the defined units of the recycled build material, which may be the same as or different from the first quantity of the unused build material.

The controller 148 may, for example, further direct that a first mixture of the received first quantity and second quantity of build materials (e.g., a 50/50 proportion, among other possible proportions) is deliverable (e.g., delivered) to the print zone 117 of the 3D print apparatus from the delivery hopper for formation of a first portion (e.g., a first 1, 2, . . . , N layers and/or a first region) associated with an object in the print zone.

The controller 148 may, for example, further direct that a third quantity of the first build material and a fourth quantity of the second build material is receivable (e.g., received) by the delivery hopper. The third quantity of the first build material may, among various examples, be a third predetermined mass, volume, and/or number of dollops of the defined units of the unused build material, which may be different from the first quantity of the unused build material. The fourth quantity of the second build material may be a fourth predetermined mass, volume, and/or number of dollops of the defined units of the recycled build material, which may be different from the second quantity of the recycled build material. The controller 148 may, for example, further direct that a second mixture of the received third quantity and fourth quantity of build materials (e.g., a 20/80 proportion, among other possible proportions) is deliverable (e.g., delivered) to the print zone 117 of the 3D print apparatus from the delivery hopper for formation of a second portion (e.g., a second N+1, N+2, . . . , M layers and/or a second region) associated with the same object in the print zone. Hence, the first portion and the second portion of the object may be formed as layers in a first region that are different from layers formed in a second region, respectively, associated with formation of the object. In some examples, the first region may correspond to an exterior region (e.g., as shown at 582 and described in connection with FIG. 5) associated with the object (e.g., the interior region 584 in which the defined structure 587 of a 3D object is formed). Hence, the second region may correspond to the interior region 584 associated with the object.

As such, the first mixture may include a proportion of the first build material relative to the second build material that is different than that included in the second mixture. The delivery hopper 103, 303, 403 may, in some examples, include a mixing component 110, 310, 410 to mix the first quantity of the first build material and the second quantity of the second build material to form the first mixture and to mix the third quantity of the first build material and the fourth quantity of the second build material to form the second mixture.

In some examples, after completion of a predetermined number of layers and/or regions utilizing the first mixture, the controller 148 may further direct that a remainder of the first mixture is purged from the delivery hopper prior to receipt of the second mixture. The first mixture may be purged by selectively operating feeder mechanism 312-1 of delivery hopper 303 to deliver the remainder of the first mixture, for example, to the recycle hopper 330, the recycled build material hopper 328, and/or the recycled supply container 126, among other possibilities, rather than to the delivery component 315. As such, the remainder of the first mixture may be reused during the same print operation in which the remainder was recovered after being purged (e.g., by the recycle hopper 330 sending the remainder to the recycled build material hopper 328).

Purging the first mixture from the delivery hopper prior to receipt of the second mixture may reduce (e.g., prevent) the potential of an unintended combination of the second mixture with the first mixture from being used in formation of the object in the print zone. However, in some examples, such a mixture may be intended to provide a more gradual transition between the first mixture and the second mixture in the object and the remainder of the first mixture may be allowed to remain in the delivery hopper (e.g., not be purged). In some examples, after a first print operation for formation of the object in the print zone has been completed, the controller 148 may further direct that a remainder of a last mixture of build material, or a single build material, is purged from the delivery hopper prior to initiation of a second print operation (e.g., for a different object).

The controller 148 may further direct that none of the first build material is sent (e.g., by directing that the respective feeder mechanism 412 not rotate) from the first build material hopper to be delivered to the delivery hopper. Hence, at least one of the first region and the second region of the object may be formed from (e.g., only from) the second build material. For example, as shown and described in connection with FIG. 4, the recycled build material may be sent (e.g., via selectively directed rotation of feeder mechanism 412-3) to the delivery hopper 403. As a result, in some examples, an exterior region 582 associated with the 3D object shown in FIG. 5 may be formed from (e.g., only from) the recycled build material (e.g., in contrast to the interior region 584 possibly being formed from a number of mixtures of the build materials).

Figure 5:
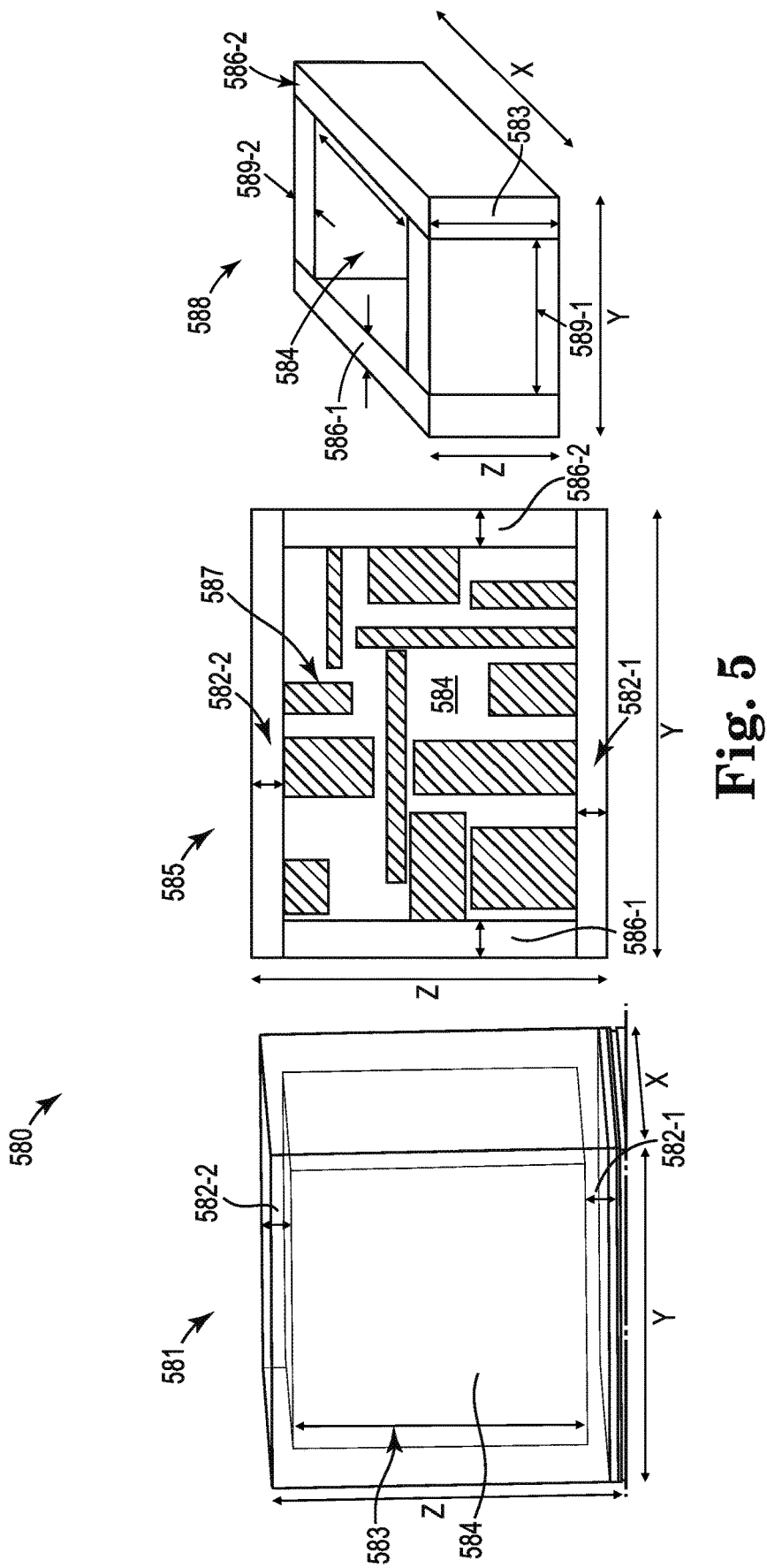
FIG. 5 illustrates an example of various views of an example of regions 580 associated with a completed 3D object consistent with the disclosure.

FIG. 5 illustrates an example of various views of an example of regions 580 associated with a completed 3D object. The regions 580 may be formed from different mixtures of build materials delivered during a 3D print operation consistent with the disclosure. To facilitate comparison between the various views, each of the views 581, 585, and 588 includes corresponding indicators of the X, Y, and/or Z axes relative to the regions 580 associated with the completed 3D object.

A perspective view 581 of the example of the regions 580 associated with the completed 3D object shows an exterior region 582. In the example shown in FIG. 5, the exterior region 582 may have two regions 582-1 and 582-2. Region 582-1 of the exterior region 582 shown in FIG. 5 may be formed as a bottom number of layers of a build material or a number of mixtures of build materials that are non-solidified or unfused. Region 582-1 may be formed in association with and/or contiguous to the build platform 120 shown and described in connection with FIG. 1. Region 582-1 may be formed in order to provide thermal insulation from the build platform 120 for the interior region 584 corresponding to the build zone in which the completed 3D object is formed. Region 582-2 of the exterior region 582 may be formed as a top number of layers of a build material or a number of mixtures of build materials to provide thermal insulation for the top of the completed 3D object. The interior region 584 of the completed 3D object may be formed from a number of layers 583 of a build material or a number of mixtures of build materials along a Z axis.

In some examples, one or both of the two regions 582-1 and 582-2 of the exterior region 582 may be formed from (e.g., only from) a single build material. For example, the bottom number of layers of region 582-1 and/or the top number of layers of region 582-2 may be formed from the recycled build material or from non-solidified or unfused reclaimed build material. In contrast, layers and/or defined structures in the interior region 584 (e.g., solidified or fused structures of the completed 3D object indicated at 587 and elsewhere by being cross-hatched) may have been formed from the unused build material and/or mixtures of the unused build material with the recycled build material and/or the reclaimed build material. Utilizing just the recycled build material or the reclaimed build material for formation of the regions 582-1 and/or 582-2 of the exterior region 582 may be more cost-effective in that these regions would not include the more costly unused build material. In addition, utilizing just the recycled build material or the reclaimed build material may be more cost-effective because either of these materials may be utilized as insulation to promote uniform solidification or fusion of either the selected unused build material or the selected mixture in the interior region 584 (e.g., corresponding to the defined structures 587 of the completed 3D object) followed by the exterior region 582 being removed, recycled, reclaimed, and/or discarded afterwards.

A schematic side view 585 (e.g., which may be a cross-section) of the example of the regions 580 associated with the completed 3D object shows the regions 580 as viewed, for example, facing a plane of the Z axis and a Y axis. As described in connection with the perspective view 581, the two regions 582-1 and 582-2 of the exterior region 582 may be formed as a number of non-solidified or unfused layers (e.g., 1-20 layers, among other possibilities) at the bottom and/or top, with regard to the Z axis, of the completed 3D object. In various examples, defined structures (e.g., as shown at 587 and elsewhere by being cross-hatched) may be formed layer by layer in the interior region 584. In some examples, the X axis may include an insulator region 586 formed layer by layer at one or both ends of the Y axis (e.g., as shown at 586-1 and/or 586-2). The X axis insulator regions 586-1, 586-2 at one or both ends of the Y axis may, in some examples, provide further insulation to promote uniform solidification or fusion of the interior region 584 of the defined structures 587 of the completed 3D object.

The X axis insulator regions 586-1, 586-2 may be formed as distinct portions of each layer used in forming the interior region 584. The X axis insulator regions 586-1, 586-2 may be formed, for example, from an 80/20 proportion of the recycled build material relative to the unused build material, in contrast to the two regions 582-1 and 582-2 of the exterior region being formed, for example, from the recycled build material. For example, a portion of a layer in the interior region 584 and the corresponding portions of the layer in the X axis insulator regions 586-1, 586-2 may be formed from an 80/20 proportion, among other possible proportions, of the recycled build material relative to the unused build material. However, the portions of the layer in the X axis insulator regions 586-1, 586-2 may be non-solidified or unfused and the defined structures 587 in the interior region may be solidified or fused (e.g., based upon differential exposure to a binding material and/or a fusing agent). In other examples, one or both X axis insulator regions 586-1, 586-2 also may be formed from (e.g., only from) the recycled build material corresponding to the layers (e.g., including the layers of the defined structures 587) formed in the interior region 584 when those layers are also formed from the recycled build material.

In various examples, the defined structures 587 formed in the interior region 584 may be formed layer by layer, for example, from the unused build material and/or from the various mixtures and/or different proportions of the unused build material and the recycled and/or reclaimed build materials described herein. For example, the various layers of the defined structures 587 of the completed 3D object may have been formed from a number of different mixtures of the unused build material and the recycled and/or reclaimed build materials (e.g., having different proportions such as 20/80, 50/50, 80/20, etc.). Because each layer extending across the Y axis may be formed from the same mixture and/or proportion of the unused build material and the recycled and/or reclaimed build materials, the corresponding layers of the X axis insulator regions 586-1, 586-2 also may be formed from the same mixture and/or proportion. In contrast, because the two regions 582-1 and 582-2 of the exterior region 582 are formed as different layers, the two regions 582-1 and 582-2 of the exterior region 582 each may be formed from build materials that are different from those utilized for the X axis insulator regions 586-1, 586-2. For example, the two regions 582-1 and 582-2 of the exterior region 582 may, in some examples, be formed from (e.g., only from) the recycled build material.

A perspective view 588 of the example of the regions 580 associated with the completed 3D object shows only X axis and Y axis insulator regions of the 3D object, without the exterior region 582, as viewed from an end facing the Y axis. In some examples, the Y axis may include an insulator region 589 formed layer by layer at one or both ends of the X axis (e.g., as shown at 589-1 and/or 589-2). The Y axis insulator regions 589-1, 589-2 at one or both ends of the X axis may, in some examples, provide further insulation to promote uniform solidification or fusion of the defined structures 587 in the interior region 584 of the completed 3D object. The Y axis insulator regions 589-1, 589-2 may be formed as distinct portions of each layer used in forming the interior region 584. The Z axis insulator regions 589-1, 589-2 may be formed, for example, from an 80/20 proportion of the recycled build material relative to the unused build material, similar to the X axis insulator walls 586-1, 586-2 at one or both ends of the Y axis and in contrast to the two regions 582-1 and 582-2 of the exterior region being formed, for example, from the recycled build material. For example, as described in connection with the X axis regions 586-1, 586-2, a portion of a layer in the interior region 584 and the corresponding portions of the layer in the Y axis insulator regions 589-1, 589-2 may be formed from an 80/20 proportion, among other possible proportions, of the recycled build material relative to the unused build material. However, the portions of the layer in the Y axis insulator regions 589-1, 589-2 may be non-solidified or unfused and the defined structures 587 in the interior region may be solidified or fused. In other examples, one or both Y axis insulator regions 589-1, 589-2 also may be formed from (e.g., only from) the recycled build material corresponding to the layers (e.g., including the layers of the defined structures 587) formed in the interior region 584 when those layers are also formed from the recycled build material.

In some examples, the regions 582-1, 582-2 of the Z axis exterior region 582, the X axis insulator regions 586-1, 586-2, and/or the Y axis insulator regions 589-1, 589-2 (e.g., the layer or layers thereof) may be removed and discarded after completion of a 3D print operation and/or completion of a 3D-printed object. In some examples, the regions 582-1, 582-2 of the Z axis exterior region 582, the X axis insulator regions 586-1, 586-2, and/or the Y axis insulator regions

589-1, 589-2 may be removed and recycled as reusable build material after completion of the 3D print operation and/or completion of the 3D-printed object (e.g., recycled by being supplied via the recycled supply container 126, in some examples).

Figure 6:
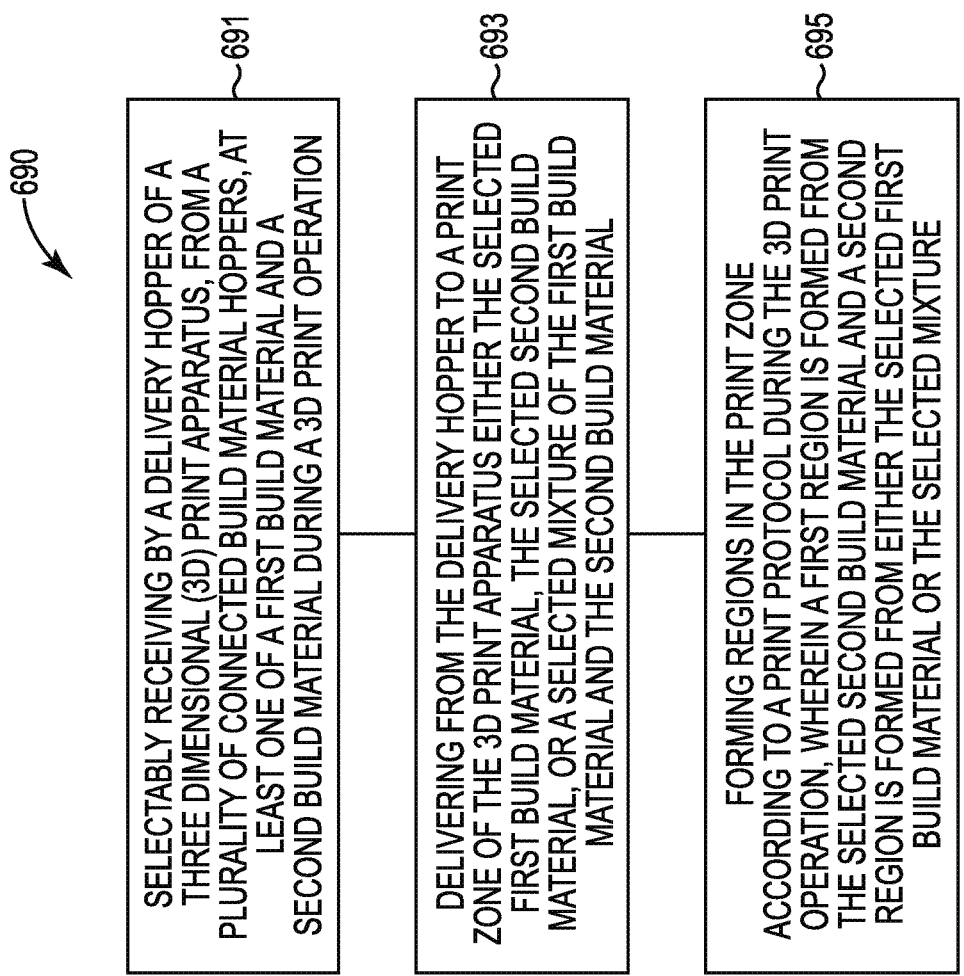
FIG. 6 illustrates an example flow diagram illustrating an example of a method for utilizing different mixtures of build materials delivered during a 3D print operation consistent with the disclosure.

FIG. 6 illustrates an example flow diagram illustrating an example of a method 690 for utilizing different mixtures of build materials delivered during a 3D print operation consistent with the disclosure. At 691, the method 690 may include selectively receiving by a delivery hopper (e.g., as shown at 303 and 403 and described in connection with FIGS. 3 and 4, respectively) of a 3D print apparatus, from a plurality of connected build material hoppers (e.g., as shown at 324, 328, and/or 335 and described in connection with FIG. 3, among other locations herein), at least one of a first build material (e.g., an unused build material) and a second build material (e.g., a recycled build material and/or a reclaimed build material), which is different from the first build material, during a 3D print operation. At 693, the method 690 may include delivering from the delivery hopper to a print zone (e.g., as shown at 315 and 415 and described in connection with FIGS. 3 and 4, respectively, and which includes the build zone 584 described in connection with FIG. 5) of the 3D print apparatus either the selected first build material, the selected second build material, or a selected mixture of the first build material and the second build material.

At 695, the method 690 may include forming regions in the print zone according to a print protocol during the 3D print operation. For example (e.g., as described in connection with FIGS. 3-5) a first region (e.g., an exterior region 582) associated with the 3D object may be formed from the selected second build material (e.g., recycled build material) and a second region (e.g., an interior region 584) associated with the 3D object may be formed from either the selected first build material (e.g., unused build material) or the selected mixture of the first build material and the second build material (e.g., the unused build material and the recycled build material). In some examples, the first region associated with the 3D object may be formed from a selected reclaimed build material and the second region associated with the 3D object may be formed from either the selected unused build material or the selected mixture of the unused build material and the recycled build material and/or the selected reclaimed build material.

In some examples, the method 690 may further include forming an interior volume (e.g., as shown at 304 and 404 and described in connection with FIGS. 3 and 4, respectively) of the delivery hopper to contain enough build material to form a predetermined number of layers of either the first region or the second region following delivery to the print zone. An interior volume of each of the plurality of connected build material hoppers 324, 328, 335 may be formed to be at least three times greater than the interior volume of the delivery hopper (e.g., because each of these hoppers may be utilized as a source of the respective build material, rather than being formed to contain enough build material sufficient to form the predetermined number of layers associated with the 3D object).

The method 690 may further include receiving, by the delivery hopper, a predetermined total volume of the at least one of the first build material (e.g., the unused build material) and the second build material (e.g., the recycled build material and/or the reclaimed build material) that is determined to form the predetermined number of layers. The predetermined total volume may, for example, be determined by the controller 148 selectively operating the feeder mechanisms 312 and 412 with input from the sensors 109-2, 109-3, 109-4 and/or from the load cells 125-1, 125-2, 125-3 of the respective build material hoppers 324, 328, 335 and/or by the sensor 309 and 409 of the delivery hopper sensing that the build material has reached a predetermined level in the interior of the delivery hopper.

The method 690 may further include forming the first region (e.g., as shown at 582 and described in connection with FIG. 5) from the selected second build material as a region exterior to a 3D object (e.g., the defined structure 587 of the 3D object in an interior region 584). The method 690 may further include insulating, by the first region, the second region (e.g., including the defined structures of the 3D object shown at 587) as an interior region (e.g., as shown at 584) corresponding to the 3D object. Insulating the second region may be performed, for example, in order to promote uniform solidification or fusion of either the selected first build material or the selected mixture of the first build material and second build material in the interior region 584 (e.g., uniform solidification or fusion of a portion of the selected build material(s) that is to be the completed 3D-printed object). The uniform solidification or fusion may be promoted by, for example, retention of energy, heat, a binding material, and/or a fusing agent in the interior region via the insulation provided by the exterior region 582.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure.

The figures herein follow a numbering convention in which the first digit corresponds to the drawing figure number and the remaining digits identify an element or component in the drawing. For example, reference numeral 103 may refer to element "03" in FIG. 1 and an analogous element may be identified by reference numeral 303 in FIG. 3. Multiple analogous elements within one figure may be referenced with a reference numeral followed by a hyphen and another number or a letter. For example, 112-1 may reference element 12-1 in FIGS. 1 and 112-2 may reference element 12-2, which can be analogous to element 12-1. Such analogous elements may be generally referenced without the hyphen and an extra numeral or letter. For example, analogous elements 112-1 and 112-2 may be generally referenced as 112 (e.g., when used in combination).

Elements shown in the various figures herein can be added, exchanged, and/or eliminated so as to provide a number of additional examples of the disclosure. The proportion and the relative scale of the elements provided in the figures are intended to illustrate the examples of the disclosure, and should not be taken in a limiting sense (e.g., in particular in connection with the relative size, shape, volume, etc., of the delivery hoppers, recycle hoppers, and build material hoppers shown and described in connection with FIGS. 1, 3, and 4). In addition, designators such as "N" and "M" may be used herein, particularly with respect to numbers of layers formed with regard to a 3D object and/or relative volumes of various hoppers, to indicate differences between particular features so designated that may be included in a number of examples of the disclosure.

What is claimed:

1. A three dimensional (3D) print apparatus, comprising:
a delivery hopper to deliver build material to a print zone of the 3D print apparatus;
a plurality of build material hoppers to which the delivery hopper is connected for receipt of at least one of a corresponding plurality of build materials;
an interior volume of the delivery hopper formed to contain enough build material sufficient to form a predetermined number of layers of a 3D object following delivery of the build material to the print zone; and
a controller of the 3D print apparatus to direct that variable proportions of a first build material relative to a second build material are receivable by the delivery hopper from the plurality of build material hoppers during a 3D print operation; and
wherein different mixtures of the variable proportions of the first build material and the second build material are deliverable to the delivery hopper during the 3D print operation to form different regions associated with formation of the 3D object including:
an insulating region corresponding to layers that are exterior to the 3D object, the insulating region being formed of a first mixture that includes a first proportion of the first build material relative to the second build material; and
an interior region corresponding to layers in which the 3D object is formed, wherein the controller further directs that none of the first build material is sent to the delivery hopper and the interior region is formed from the second build material, and wherein the layers of the insulating region are formed from a different type of build material from the layers of the interior region.

2. The apparatus of claim 1, further comprising:
a sensor connected to the delivery hopper to determine that at least one of the corresponding plurality of build materials received by the delivery hopper is sufficient to form the predetermined number of layers of the 3D object.

3. The apparatus of claim 1, wherein:
the plurality of build material hoppers comprises:
a first build material hopper as a source of an unused build material; and
a second build material hopper as a source of a recycled build material, wherein the recycled build material is delivered to the second build material hopper by diversion of at least one of the unused build material and previously recycled build material from delivery to the delivery hopper.

4. The apparatus of claim 3, wherein the plurality of build material hoppers further comprises:
a third build material hopper as a source of a reclaimed build material, wherein the reclaimed build material is delivered to the third build material hopper by reclamation of non-solidified or unfused build material from the print zone; and
wherein the non-solidified or unfused build material is at least one of the unused build material and the recycled build material delivered from the delivery hopper to the print zone.

5. The apparatus of claim 1, wherein:
the delivery hopper, the print zone, the plurality of build material hoppers, and a recycle hopper to deliver a recycled build material to the second build material hopper are connected via a pneumatic conveyance system; and
at least one of the delivery hopper and the recycle hopper is structured to apply centrifugal force to the build material input through an input conduit, as propelled by gas used in the pneumatic conveyance system, to promote settling of the build material in order to promote separation of the build material and the gas.

6. A system, comprising:
a three dimensional (3D) print apparatus comprising a delivery hopper connected to a source of a first build material and a source of a second build material; and
a controller of the 3D print apparatus to direct that:
a first quantity of the first build material and a second quantity of the second build material is receivable by the delivery hopper;
a first mixture of a received first quantity and second quantity of build materials is deliverable to a print zone of the 3D print apparatus from the delivery hopper for formation of layers of an insulating region associated with an object in the print zone;
a third quantity of the first build material and a fourth quantity of the second build material is receivable by the delivery hopper; and
a second mixture of a received third quantity and fourth quantity of build materials is deliverable to the print zone of the 3D print apparatus from the delivery hopper for formation of layers of an interior region associated with the object in the print zone; and
wherein the first mixture includes a proportion of the first build material relative to the second build material that is different than that included in the second mixture, wherein the layers of the insulating region are exterior to and underlay the object; wherein the controller further directs that a remainder of the first mixture is purged from the delivery hopper prior to receipt of the second mixture; and wherein the layers of the interior region correspond to the object that is formed of the second mixture, and wherein the layers of the insulating region are formed from a different type of build material from the layers of the interior region.

7. The system of claim 6, wherein:
the delivery hopper comprises a mixing component to mix the first quantity of the first build material and the second quantity of the second build material to form the first mixture and to mix the third quantity of the first build material and the fourth quantity of the second build material to form the second mixture.

8. The system of claim 6, wherein the first build material is an unused build material and the second build material is a recycled build material.

9. The system of claim 6, wherein the delivery hopper is formed to contain enough build material sufficient to form ten (10) layers associated with the object.

10. A method, comprising:
selectively receiving by a delivery hopper of a three dimensional (3D) print apparatus, from a plurality of connected build material hoppers, at least one of a first build material and a second build material, which is different from the first build material, during a 3D print operation to form a 3D object;
delivering from the delivery hopper to a print zone of the 3D print apparatus either the selected first build material, the selected second build material, or a selected mixture of the first build material and the second build material that is different than the first build material;
forming regions in the print zone according to a print protocol during the 3D print operation, wherein an insulating region corresponds to layers that are exterior to and underlay the 3D object, wherein the insulating region is formed from the selected second build material, and wherein an interior region corresponds to layers of the 3D object that is formed from either the selected first build material or the selected mixture, and wherein the layers of the insulating region are formed from a different type of build material from the layers of the interior region;

forming an interior volume of the delivery hopper to contain enough build material to form a predetermined number of layers of either the insulating region or the interior region following delivery to the print zone;

forming an interior volume of each of the plurality of connected build material hoppers to be at least three times greater than the interior volume of the delivery hopper; and receiving by the delivery hopper a predetermined total volume of the at least one of the first build material and the second build material that is determined to form the predetermined number of layers.

11. The apparatus of claim 1, wherein the first build material is an unused build material and the second build material is a recycled build material.

12. The apparatus of claim 11, wherein the first mixture that form the insulating region includes a larger proportion of the recycled build material than a portion of the recycled build material included in the second mixture.

13. The apparatus of claim 12, wherein 100 percent of the first mixture is recycled build material.

* * * * *